United States Patent
Kobe et al.

(10) Patent No.: US 12,182,489 B2
(45) Date of Patent: Dec. 31, 2024

(54) ENFORCING SIMULATION-BASED PHYSICAL DESIGN RULES TO OPTIMIZE CIRCUIT LAYOUT

(71) Applicant: Cirrus Logic International Semiconductor Ltd., Edinburgh (GB)

(72) Inventors: Michael R. Kobe, Austin, TX (US); David Kostusiak, Austin, TX (US); Christian Larsen, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 492 days.

(21) Appl. No.: 16/852,640

(22) Filed: Apr. 20, 2020

(65) Prior Publication Data
US 2020/0334408 A1 Oct. 22, 2020

Related U.S. Application Data (60) Provisional application No. 62/836,959, filed on Apr. 22, 2019.

(51) Int. Cl.
*G06F 30/398* (2020.01)
*G06F 30/20* (2020.01)

(52) U.S. Cl.
CPC .......... *G06F 30/398* (2020.01); *G06F 30/20* (2020.01)

(58) Field of Classification Search
USPC .......................................................... 716/52
See application file for complete search history.

(56) References Cited

U.S. PATENT DOCUMENTS

| | | | |
|---|---|---|---|
| 7,490,309 B1 | 2/2009 | Kukal et al. | |
| 10,127,338 B2 * | 11/2018 | Chen | G06F 30/367 |
| 10,567,895 B2 | 2/2020 | Lawrence et al. | |
| 2008/0141196 A1* | 6/2008 | Ohshima | G06F 30/39 716/112 |
| 2014/0007031 A1* | 1/2014 | Huang | G06F 30/367 716/112 |
| 2015/0074627 A1 | 3/2015 | Huang et al. | |
| 2015/0286772 A1* | 10/2015 | Donnelly | G06F 30/367 716/112 |
| 2018/0341742 A1 | 11/2018 | Yazdani et al. | |

OTHER PUBLICATIONS

International Search Report and Written Opinion of the International Searching Authority, International Application No. PCT/US2020/029072, mailed Jul. 29, 2020.
Office Action, Intellectual Property Office of Taiwan, Application No. 109113552, issued Oct. 31, 2023.

* cited by examiner

*Primary Examiner* — Bryce M Aisaka
(74) *Attorney, Agent, or Firm* — Jackson Walker L.L.P.

(57) ABSTRACT

A method for enforcing design rules in a circuit layout may include providing a circuit schematic for an integrated circuit to a circuit simulator, wherein the circuit layout is derived from a circuit schematic, using the circuit simulator to simulate the circuit schematic and generate simulated electrical parameters for the integrated circuit, and using the simulated electrical parameters to enforce physical design rules when generating the circuit layout based on the simulated electrical parameters.

18 Claims, 5 Drawing Sheets

ENFORCING SIMULATION-BASED PHYSICAL DESIGN RULES TO OPTIMIZE CIRCUIT LAYOUT

RELATED APPLICATION

The present disclosure claims priority to U.S. Provisional Patent Application Ser. No. 62/836,959, filed Apr. 22, 2019, which is incorporated by reference herein in its entirety.

FIELD OF DISCLOSURE

The present disclosure relates in general to the field of electronics, particularly to designing and laying out integrated circuits, and, more particularly, to methods for using simulated data and enforcing physical design rules based on the simulated data to optimize die space for a circuit layout.

BACKGROUND

The process of laying out an integrated circuit or chip may involve generating a circuit schematic and providing the circuit schematic to a simulator that simulates the circuit schematic that is then used to generate a circuit layout. Prior to simulation though, several assumptions may be made for values in the circuit schematic, such as nets depicted in the circuit schematic being assumed to be at either high voltage or current values or low voltage or current values. Design rules, though, may dictate certain geometries, physical locations, amount of spacing, and other requirements be maintained, such as in the case of a high voltage net requiring a minimum amount of spacing distance to another net, or in another case in which certain geometry nodes are high, requiring metal layers be skipped.

However, such assumed voltage or current values may not correctly reflect actual real-world values for nets of the circuit schematic, particularly after the circuit schematic is simulated and/or if a change is made to the circuit schematic. Simulated results may show that a net actually operates at a voltage or current value or range that is different than what was assumed or that a net is proximate to another net that does not require such stringent spacing requirements (e.g., that an electrical node is not a high voltage node requiring one or more metal layers of a physical layout be skipped).

Figure 1:
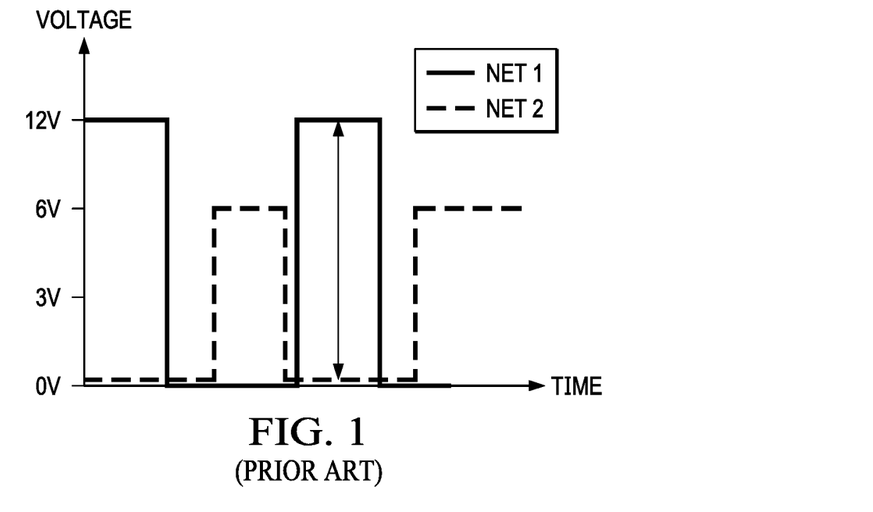
FIG. 1 illustrates an example of making a determination of spacing between two nets in a circuit layout, as is known in the art.

For example, FIG. 1 illustrates an example of how a determination of spacing between two nets in a circuit layout may be made, as is known in the art. In this case, the maximum voltage value for each of the two nets may be identified, and an assumption may be made that spacing between the two nets needs to be determined based on the identified maximum voltage value found among the two nets. In the example of FIG. 1, the maximum voltage value for net 1 is 12 volts while the maximum voltage value for net 2 is 6 volts. Thus, an existing solution would be checking for a spacing for 12 volts between net 1 and net 2 in the circuit layout.

However, such a simplistic solution of just using and assuming maximum voltage or current values for nets of a circuit may lead to generating wasted and unnecessary space within the circuit layout as it does not account for a true actual comparative maximum voltage or current values for the nets. Also, when it is identified that nets are at a lower voltage or current value relative to each other than what was originally assumed, there exists no approach for updating or rerunning the simulation so that the physical requirements for the circuit layout is updated based on the updated net values. Furthermore, when changes are made to a circuit schematic and the circuit schematic is simulated such that net voltage or current values have changed, no known approach exists to readily update the simulated circuit net values so that the physical layout requirements (such as net spacing requirements or metal layer skipping requirements) are updated as well.

SUMMARY

In accordance with the teachings of the present disclosure, certain disadvantages and problems associated with traditional approaches to enforcing layout design requirements may be reduced or eliminated.

In accordance with embodiments of the present disclosure, a method for enforcing design rules in a circuit layout may include providing a circuit schematic for an integrated circuit to a circuit simulator, wherein the circuit layout is derived from a circuit schematic, using the circuit simulator to simulate the circuit schematic and generate simulated electrical parameters for the integrated circuit, and using the simulated electrical parameters to enforce physical design rules when generating the circuit layout based on the simulated electrical parameters.

In accordance with these and other embodiments of the present disclosure, a computer program product for enforcing design rules in a circuit layout may include a computer usable medium having computer readable code physically embodied therein, said computer program product further comprising computer readable program code for providing a circuit schematic for an integrated circuit to a circuit simulator, wherein the circuit layout is derived from a circuit schematic, using the circuit simulator to simulate the circuit schematic and generate simulated electrical parameters for the integrated circuit, and using the simulated electrical parameters to enforce physical design rules when generating the circuit layout based on the simulated electrical parameters.

In accordance with these and other embodiments of the present disclosure, a system for enforcing design rules in a circuit layout may include a processor and a memory device coupled to the processor, wherein the memory device stores a plurality of instructions that when executed by the processor provides at least one software module that includes a circuit simulator and a verification module. The circuit simulator may be configured to receive a circuit schematic for an integrated circuit to a circuit simulator, wherein the circuit layout is derived from a circuit schematic, and simulate the circuit schematic and generate simulated electrical parameters for the integrated circuit. The verification module may be configured to use the simulated electrical parameters to enforce physical design rules when generating the circuit layout based on the simulated electrical parameters.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

DETAILED DESCRIPTION

Embodiments of the present disclosure may provide methods and systems for enforcing design rules to set physical design requirements for a circuit layout. In accordance with embodiments of the present disclosure, a circuit schematic may be generated from which a circuit layout may be derived. The circuit schematic may be simulated by a simulator to generate simulated parameters within the circuit schematic. The simulated parameters may be any electrical parameters for an electrical integrated circuit, such as voltage or current values for nets, electromigration parameters, and/or other parameters. The simulated parameters may be annotated and recorded within the circuit schematic. The recorded simulated parameters of the annotated circuit schematic may be used to enforce physical design rules in the circuit layout. For example, if the simulated parameters are voltage or current values for nets of the integrated circuit, then the recorded simulated voltage or current values may be used to drive physical verification to optimize the circuit layout. As another example, if one of the simulated parameters is a recorded low voltage value for a geometry node that had been deemed a high voltage geometry node, then the recorded low voltage value for the geometry node may be used to avoid skipping a metal layer that may otherwise be required for the geometry node. Simulated parameters may be checked not only in isolation but also relative to other parameters. For example, the design rules may be enforced for each net relative to other nets. Accordingly, the systems and methods disclosed herein may eliminate or severely reduce an amount of otherwise wasted space in a circuit layout that may occur using existing approaches.

As used in this application, a "net" may refer to a unique integrated circuit element with a voltage or current value at any point in time. Thus, a net may comprise an electrical node of a circuit.

While much of the discussion below contemplates using simulated voltage levels to back annotate a circuit schematic, embodiments of the present disclosure are not limited to using voltage or any other particular simulated parameter, but may use any electrical parameter for an electrical integrated circuit if such electrical parameter is capable of being simulated, recorded, and used to enforce circuit layout requirements.

Figure 2A:
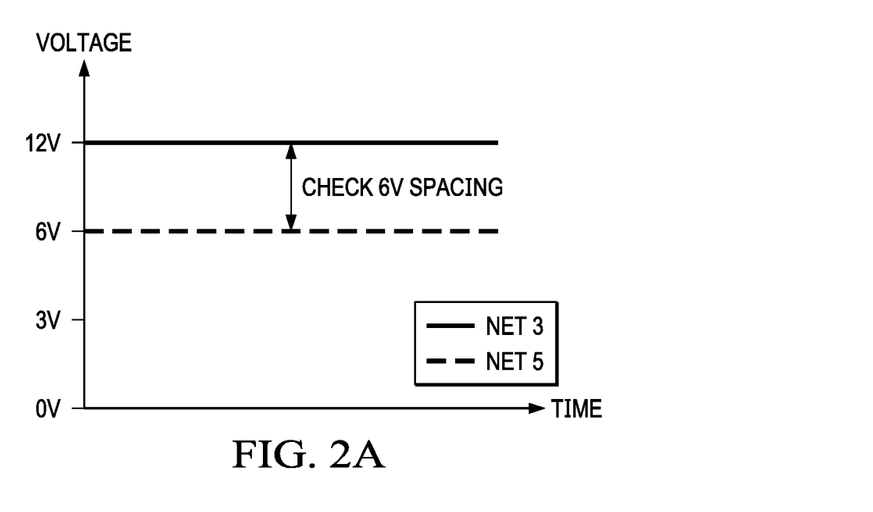
FIGS. 2A-2C each illustrate a pair of voltage waveforms to demonstrate making determinations of spacing between two nets in a circuit layout based on simulation-based physical design rules to optimize circuit layout, in accordance with embodiments of the present disclosure.
Figure 2B:
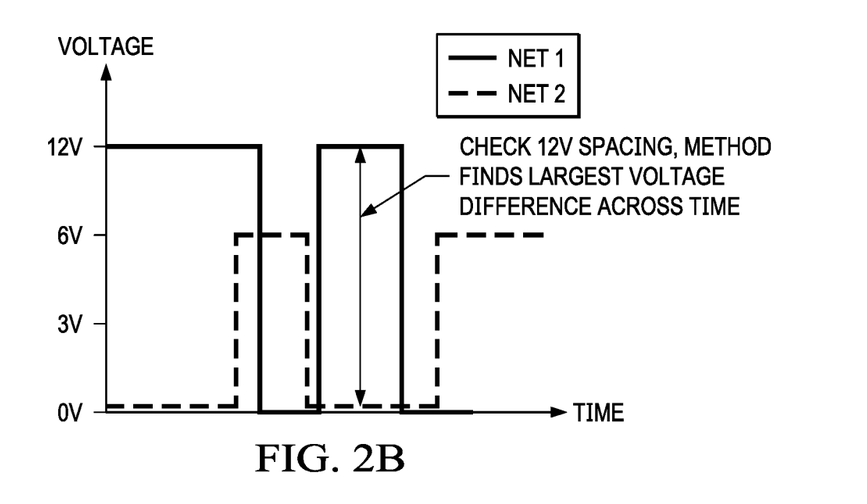
Figure 2C:
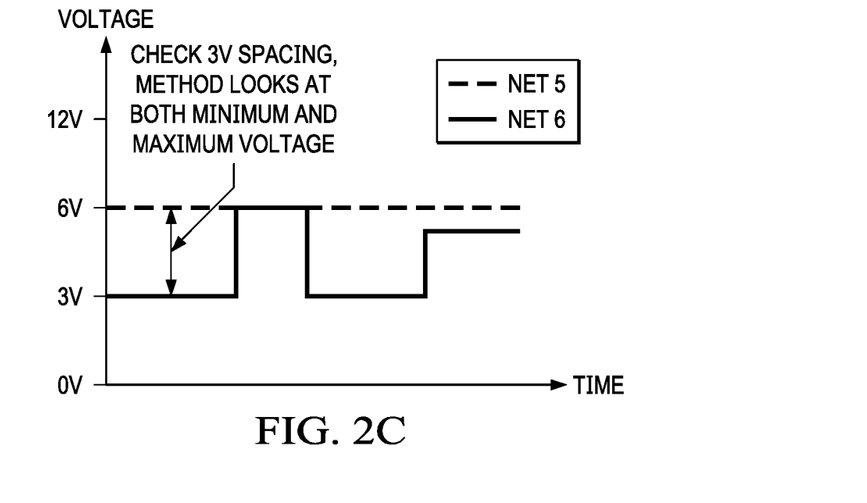

FIGS. 2A-2C each illustrate a pair of voltage waveforms to demonstrate making determinations of spacing between two nets in a circuit layout-based simulation-based physical design rules to optimize circuit layout, in accordance with embodiments of the present disclosure. For example, FIG. 2A illustrates example voltage waveforms for an example net 3 and an example net 5. Using existing approaches, it may be initially assumed that a 12-volt spacing determination is made based on a maximum voltage among example net 3 and example net 5. However, as shown in FIG. 2A, simulation may show that net 3 has a constant voltage of 12 volts and net 5 has a constant voltage of 6 volts. Because simulation shows that a maximum difference between net 3 and net 5 is 6 volts (e.g., 12 volts–6 volts), the simulator conducting the simulation may back annotate the circuit schematic accordingly, in order to enforce a 6-volt spacing determination in the circuit layout generated from the circuit schematic, instead of the 12-volt spacing assumed by existing approaches, thus potentially minimizing space needed in the circuit layout to enforce spacing requirements.

As another example, FIG. 2B illustrates example voltage waveforms for an example net 1 and an example net 2. Using existing approaches, it may be initially assumed that a 12-volt spacing determination is made based on a maximum voltage among example net 1 and example net 2. However, as shown in FIG. 2B, simulation may show that a maximum voltage delta between net 1 and net 2 may be 12 volts, despite the fact that voltage deltas of 6 volts occur from between 6 volts and 12 volts and from 0 volts and 6 volts. Because simulation shows that a maximum difference between net 1 and net 2 is 12 volts, the simulator conducting the simulation may back annotate the circuit schematic accordingly, in order to enforce a 12-volt spacing determination in the circuit layout generated from the circuit schematic.

As a further example, FIG. 2C illustrates example voltage waveforms for an example net 6 and example net 5. Using existing approaches, it may be initially assumed that a 6-volt spacing determination is made based on a maximum voltage among example net 6 and example net 5. However, as shown in FIG. 2C, simulation may show that a maximum voltage delta between net 6 and net 5 may be 3 volts. Because simulation shows that a maximum delta between net 6 and net 5 is 3 volts, the simulator conducting the simulation may back annotate the circuit schematic accordingly, in order to enforce a 3-volt spacing determination in the circuit layout generated from the circuit schematic, instead of the 6-volt spacing assumed by existing approaches, thus potentially minimizing space needed in the circuit layout to enforce spacing requirements.

Figure 3:
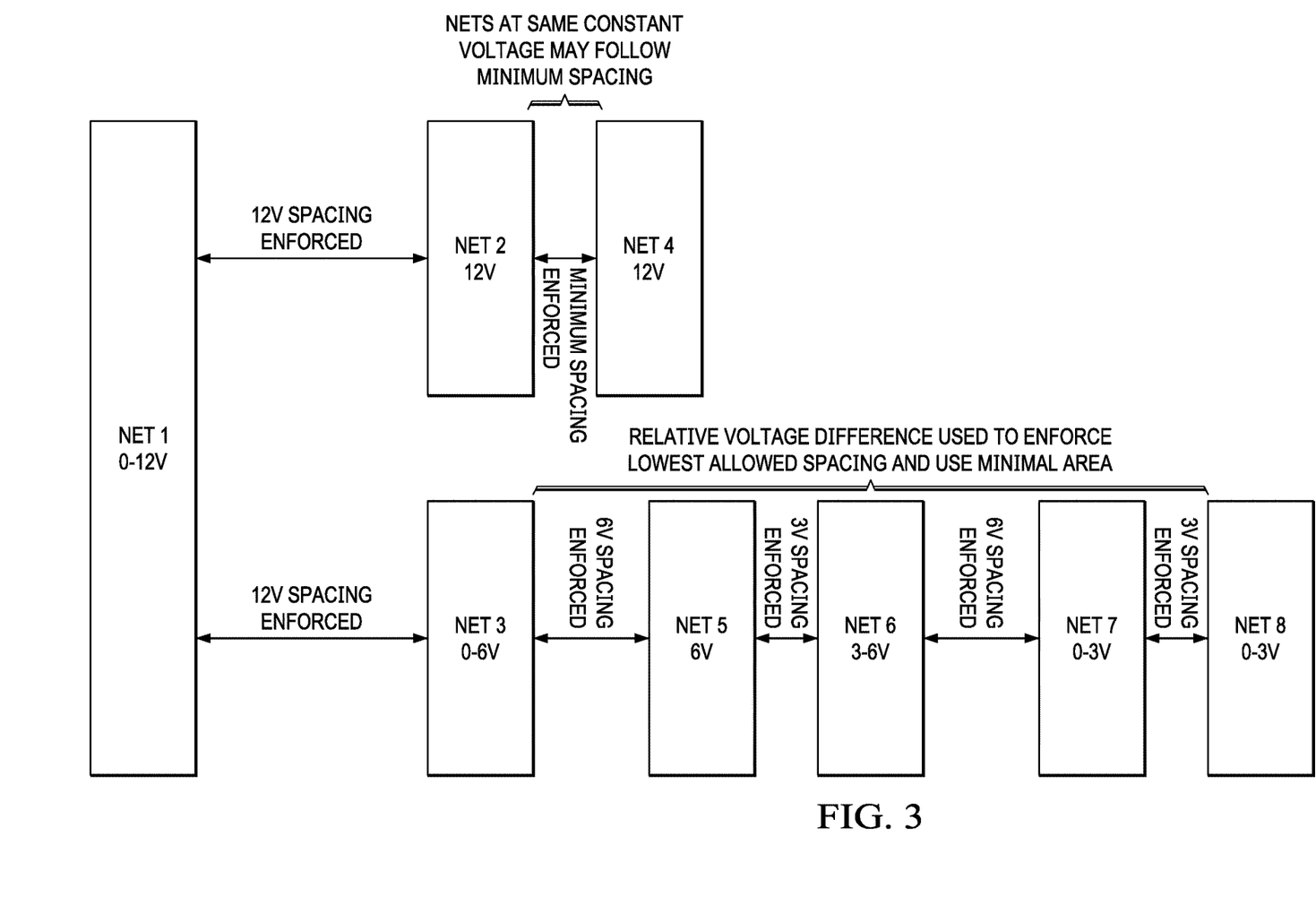
FIG. 3 illustrates examples of metal spacing of nets based on simulation-based physical design rules to optimize circuit layout, in accordance with embodiments of the present disclosure.

FIG. 3 illustrates examples of metal spacing of nets based on simulation-based physical design rules to optimize circuit layout, in accordance with embodiments of the present disclosure. In particular, FIG. 3 illustrates example net metal spacings determined after simulation and based on the maximum voltage delta or difference between two nets (e.g., the highest possible voltage between two nets subtracted by the lowest possible voltage between the two nets). Such determined net metal spacings may then be used to optimize circuit layout. For example, FIG. 3 shows that a maximum voltage delta between example net 2 and example net 4 is zero (e.g., 12 volts–12 volts). Thus, only a minimum spacing requirement between net 2 and net 4 may be enforced in circuit layout. As another example, FIG. 3 shows that maximum voltage deltas between example net 1 and example net 2 and between example net 1 and example net 3 may each be 12 volts (e.g., 12 volts–0 volts). Thus, a 12-volt spacing requirement between net 1 and net 2 and between net 1 and net 3 may be enforced in circuit layout. As a further example, FIG. 3 shows that a maximum voltage delta between example net 3 and example net 5 is 6 volts (e.g., 6 volts−0 volts). Thus, a 6-volt spacing requirement between net 3 and net 5 may be enforced in circuit layout. As an additional example, FIG. 3 shows that a maximum voltage delta between example net 6 and example net 5 is 3 volts (e.g., 6 volts−3 volts). Thus, a 3-volt spacing requirement between net 6 and net 5 may be enforced in circuit layout. As another example, FIG. 3 shows that a maximum voltage delta between example net 6 and example net 7 is 6 volts (e.g., 6 volts−0 volts). Thus, a 6-volt spacing requirement between net 6 and net 7 may be enforced in circuit layout. As an additional example, FIG. 3 shows that a maximum voltage delta between example net 8 and example net 7 is 3 volts (e.g., 3 volts−0 volts). Thus, a 3-volt spacing requirement between net 8 and net 7 may be enforced in circuit layout.

Figure 4:
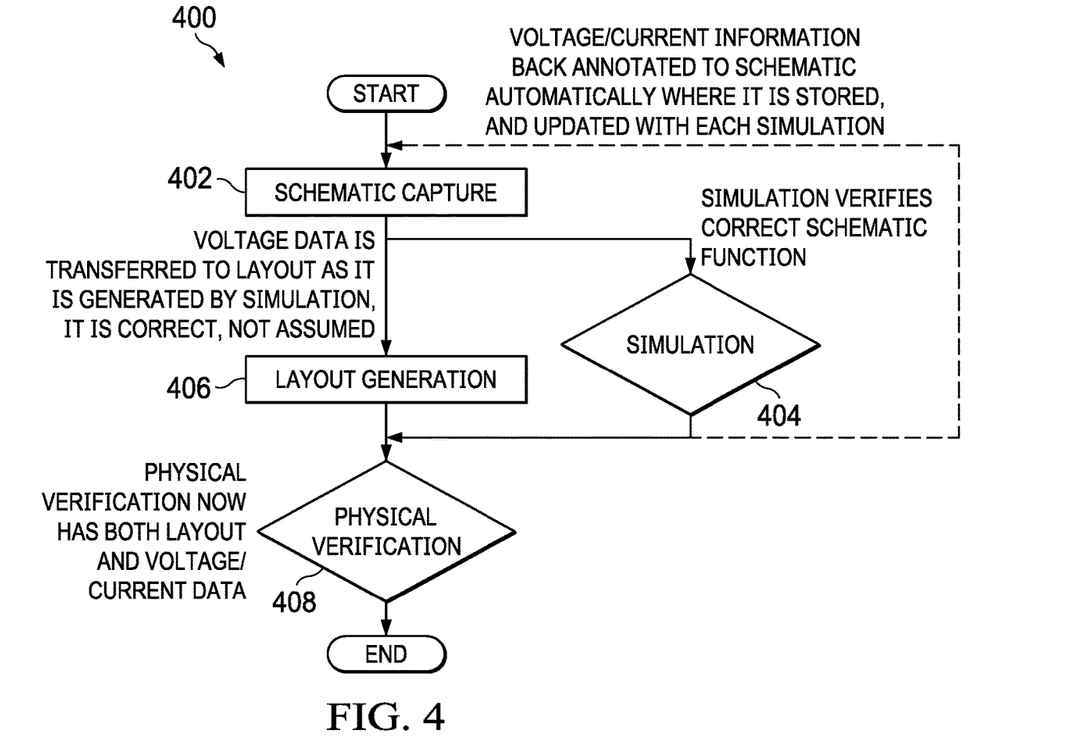
FIG. 4 illustrates a flow chart of an example method for enforcing simulation-based physical design rules to optimize circuit layout, in accordance with the present disclosure.

FIG. 4 illustrates a flow chart of an example method 400 for enforcing simulation-based physical design rules to optimize circuit layout, in accordance with the present disclosure. As shown in FIG. 4, method 400 may begin at step 402. At step 402, a circuit schematic may be captured (e.g., stored in a memory). At step 404, a simulator may perform a simulation on the circuit schematic to verify correct schematic function. The simulator may also automatically back annotate electrical parameters resulting from the simulation (e.g., voltage and/or current information for various nets of the circuit schematic) to the circuit schematic. The process of steps 402 and 404 may be repeated multiple times (e.g., in response to modifications to the circuit schematic) and each time, the simulator may back annotate the electrical parameters resulting from the simulation and record such electrical parameters to the circuit schematic.

At step 406, a circuit layout generator may receive the circuit schematic, including the recorded simulated electrical parameters (e.g., simulated voltage and/or current information), and generate a physical circuit layout based on the simulated electrical parameters in order to enforce minimum spacing requirements based on the simulated electrical parameters. As the circuit layout is generated, electrical parameters (e.g., simulated voltage and/or current information) may be based on actual operating conditions and this information need not be assumed. Physical verification at step 408 may use the recorded simulated electrical parameters to drive physical verification of an integrated circuit to optimize circuit layout.

Although the foregoing contemplates a simulation back annotating a circuit schematic and the circuit schematic including the back annotated electrical parameters being used to generate a physical circuit layout based on the simulated electrical parameters in order to enforce minimum spacing requirements based on the simulated electrical parameters, in some embodiments, such simulated electrical parameters may be directly provided to a circuit layout generator or directly provided to a physical verification tool to enforce minimum spacing requirements based on the simulated electrical parameters.

Figure 5:
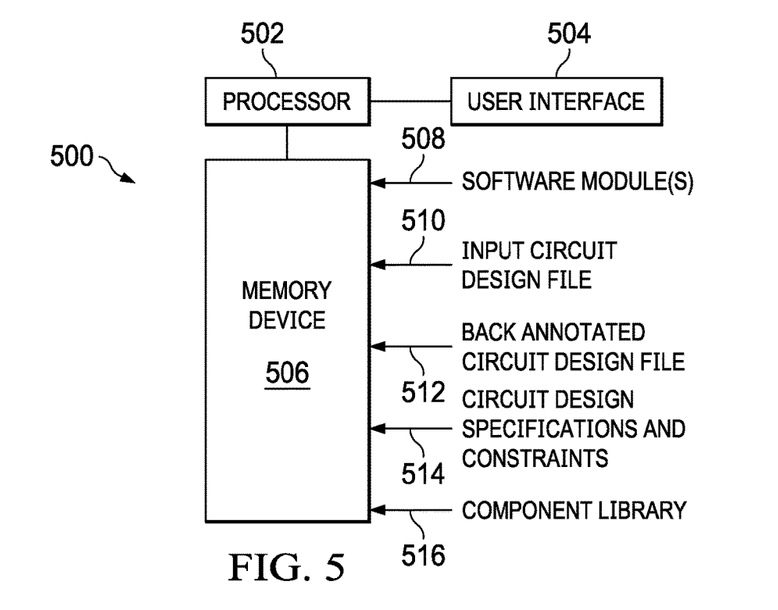
FIG. 5 illustrates a block diagram of an example circuit design system, in accordance with embodiments of the present disclosure.

FIG. 5 illustrates a block diagram of an example circuit design system 500, in accordance with embodiments of the present disclosure. Circuit design system 500 may be capable of receiving and synthesizing, analyzing, and/or optimizing an initial circuit design including enforcing simulated-based physical design requirements. Circuit design system 500 may comprise any computing device, such as a computer that has a processor 502, a user interface 504, and a memory device 506.

Processor 502 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 502 may interpret and/or execute program instructions and/or process data stored in memory device 506 and/or another component of circuit design system 500.

Memory device 506 may be communicatively coupled to processor 502 and may include any system, device, or apparatus configured to retain program instructions and/or data for a period of time (e.g., computer-readable media). Memory device 506 may include random access memory (RAM), read-only memory (ROM), electrically erasable programmable read-only memory (EEPROM), flash memory, magnetic storage, opto-magnetic storage, or any suitable selection and/or array of volatile or non-volatile memory that retains data after power to circuit design system 500 is turned off. Memory device 506 may store different types of instructions and/or data, including, but not limited to software module(s) 508 including executable instructions that may be executed by processor 502 (e.g., circuit design synthesis, analysis and/or optimization tools) to control processor 502 in performing its various operations, an input circuit design file 510, a back annotated circuit design file 512, circuit design specifications and constraints 514, a component library 516, and/or other data, information, or instructions. One or more of input circuit design file 510, circuit design specifications and constraints 514, and component library 516.

User interface 504 may comprise any instrumentality or aggregation of instrumentalities by which a user may interact with circuit design system 500. For example, user interface 504 may permit a user to input data and/or instructions into circuit design system 500, and/or otherwise manipulate circuit design system 500 and its associated components (e.g., via keyboard, mouse, trackpad, or other pointing device). User interface 504 may also permit circuit design system 500 to communicate data to a user, e.g., by way of a display device.

Figure 6:
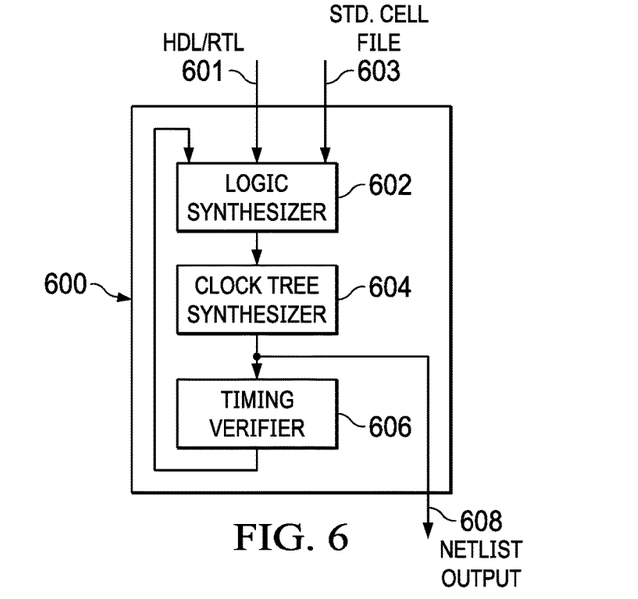
FIG. 6 illustrates a block diagram of a synthesis software tool, in accordance with embodiments of the present disclosure.

FIG. 6 illustrates a block diagram of a synthesis software tool 600, in accordance with embodiments of the present disclosure. Synthesis software tool 600 may be stored as computer-readable instructions in memory device 506 and readable and executable by processor 502 of circuit design system 500. Synthesis software tool 600 may comprise a logic synthesizer module 602, a clock tree synthesizer module 604, and a timing verifier 606. Logic synthesizer module 602 may receive a high-level description language (HDL) or register transfer level (RTL) circuit description 601 and a standard cell technology file 603. Functional logic may be generated from standard cell technology file 603 by logic synthesizer module 602. Standard cell technology file 603 may include data and information for characterizing one or more standard cells. Clock tree synthesizer module 604 may generate clock tree paths in the integrated circuit from a clock source to the clock inputs of the various elements of an integrated circuit. Timing verifier module 606 may receive a netlist including data paths and clock tree paths of the integrated circuit design to verify that timing specifications are satisfied with the given logical design of the integrated circuit. Timing verifier module 606 may verify that the timing specifications of the logical design are in fact met to output a netlist 608. Netlist 608 may be sent to a foundry for manufacturing of the integrated circuit described by netlist 608.

Figure 7:
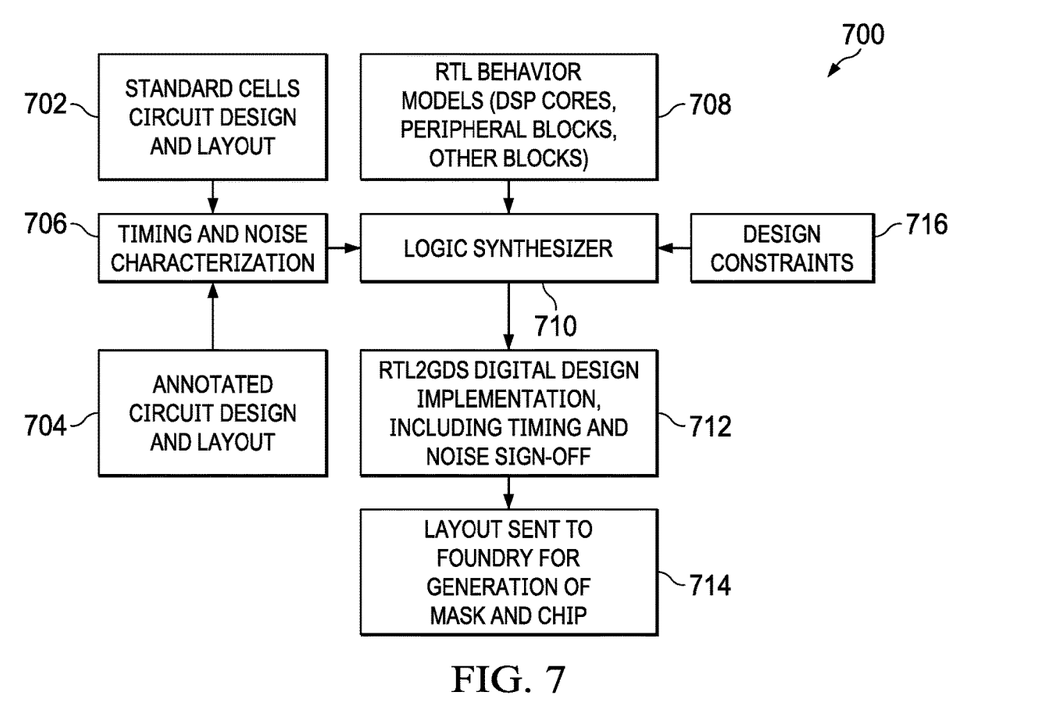
FIG. 7 illustrates a flow chart of an example method for synthesizing an integrated circuit design with multi-bit pulsed latch cells in accordance with the present disclosure.

FIG. 7 illustrates a flow chart of an example method 700 for synthesizing an integrated circuit design, in accordance with the present disclosure. Method 700 may be embodied in instructions that are stored in memory device 506 of circuit design system 500 and read and executed by processor 502. For example, method 700 may be implemented by synthesis software tool 600. In accordance with method 700, a standard cell circuit design and layout 702 for an integrated circuit design may be provided to a timing and noise characterization block 706, and at block 704, back annotated circuit design and layout for the integrated circuit design that incorporates recorded simulated electrical parameters (e.g., simulated voltage and/or current information) for nets of an integrated circuit in accordance with the present disclosure may also be provided to timing and noise characterization block 706. The timing and noise characterization block 706 may provide timing and noise characterizations of the integrated circuit design to logic synthesizer module 602 at logic synthesizer process block 710. Characterizations of the laid-out standard cells and the laid-out multi-bit cells may also be provided to logic synthesizer module 602 at logic synthesizer process block 710. The digital RTL behavioral models of block 708 may be among the RTL circuit description 601 provided to logical synthesizer processor block 710. RTL behavioral models of block 708 may include but are not limited to digital signal processing (DSP) cores, peripheral blocks, and other blocks that may be digitally designed. Furthermore, the design constraints of block 716, that may include, without limitation, minimum sizing and spacing constraints, and other parameters, may also be provided to logic synthesizer process block 710. Within logic synthesizer process block 710, logic synthesizer 602 may synthesize the data and information relating to the laid-out standard cells, the laid-out multi-bit cells, the timing and noise characterizations, the various digital RTL behavioral models, and the design constraints to provide a physical design layout that results in a RTL to Graphic Data System ("GDS") digital design implementation at block 712. GDS is a format that may be used to control integrated circuit photomask plotting. The RTL-to-GDS digital design implementation includes at least the timing information and noise sign-off information. The GDS file containing the physical design layout information may be sent to a foundry for generation of a mask and the semiconductor chip at block 714.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for enforcing design rules in a circuit layout, comprising:
   providing a circuit schematic for an integrated circuit to a circuit simulator;
   using the circuit simulator to perform a single simulation of the circuit schematic and generate simulated electrical parameters for the integrated circuit;
   generating circuit layout based on the circuit schematic and the simulated electrical parameters; and
   performing physical verification of the circuit layout, using the simulated electrical parameters from the single simulation during physical verification to define physical design rules for the circuit layout and enforce the physical design rules in the circuit layout without further simulation of the circuit schematic.

2. The method of claim 1, further comprising:
   back annotating and recording the simulated electrical parameters to the circuit schematic; and
   extracting the simulated electrical parameters from the circuit schematic for using the simulated electrical parameters to enforce physical design rules when generating the circuit layout based on the simulated electrical parameters.

3. The method of claim 1, wherein the simulated electrical parameters comprise one of a simulated voltage characteristic and a simulated current characteristic for each of at least two nets of the integrated circuit.

4. The method of claim 3, wherein enforcing the physical design rules comprises enforcing the physical design rules for each of the at least two nets relative to each of the other of the at least two nets.

5. The method of claim 4, wherein:
the physical design rules include a minimum spacing requirement between two nets based on voltage of the two nets; and
enforcing the minimum spacing requirement comprises defining the minimum spacing requirement based on a maximum difference between simulated voltages of the two nets as recorded in the simulated electrical parameters in the circuit schematic.

6. The method of claim 1, further comprising generating a physical circuit layout based on the simulated electrical parameters.

7. A computer program product for enforcing design rules in a circuit layout, the computer program product comprising a computer usable medium having computer readable code physically embodied therein, said computer program product further comprising computer readable program code for:
providing a circuit schematic for an integrated circuit to a circuit simulator;
using the circuit simulator to perform a single simulation of the circuit schematic and generate simulated electrical parameters for the integrated circuit;
generating circuit layout based on the circuit schematic and the simulated electrical parameters; and
performing physical verification of the circuit layout, using the simulated electrical parameters from the single simulation during physical verification to define physical design rules of the circuit layout and enforce the physical design rules in the circuit layout without further simulation of the circuit schematic.

8. The computer program product of claim 7, wherein the computer readable program code is further configured to:
back annotate and record the simulated electrical parameters to the circuit schematic; and
extract the simulated electrical parameters from the circuit schematic for using the simulated electrical parameters to enforce physical design rules when generating the circuit layout based on the simulated electrical parameters.

9. The computer program product of claim 7, wherein the simulated electrical parameters comprise one of a simulated voltage characteristic and a simulated current characteristic for each of at least two nets of the integrated circuit.

10. The computer program product of claim 7, wherein enforcing the physical design rules comprises enforcing the physical design rules for each of the at least two nets relative to each of the other of the at least two nets.

11. The computer program product of claim 10, wherein:
the physical design rules include a minimum spacing requirement between two nets based on voltage of the two nets; and
enforcing the minimum spacing requirement comprises defining the minimum spacing requirement based on a maximum difference between simulated voltages of the two nets as recorded in the simulated electrical parameters in the circuit schematic.

12. The computer program product of claim 7, wherein the computer readable program code is further configured to generate a physical circuit layout based on the simulated electrical parameters.

13. A system for enforcing design rules in a circuit layout, comprising:
a processor; and
a memory device coupled to the processor, wherein the memory device stores a plurality of instructions that when executed by the processor provides at least one software module that includes:
a circuit simulator configured to:
receive a circuit schematic for an integrated circuit to a circuit simulator; and
simulate the circuit schematic and generate simulated electrical parameters for the integrated circuit;
a layout module configured to generate circuit layout based on the circuit schematic and the simulated electrical parameters; and
a verification module configured to perform physical verification of the circuit layout, using the simulated electrical parameters during physical verification to define physical design rules for the circuit layout and enforce the physical design rules in the circuit layout without further simulation of the circuit schematic.

14. The integrated circuit design system of claim 13, wherein:
the circuit simulator is further configured to back annotate and record the simulated electrical parameters to the circuit schematic; and
the verification module is further configured to extract the simulated electrical parameters from the circuit schematic for using the simulated electrical parameters to enforce physical design rules when generating the circuit layout based on the simulated electrical parameters.

15. The integrated circuit design system of claim 13, wherein the simulated electrical parameters comprise one of a simulated voltage characteristic and a simulated current characteristic for each of at least two nets of the integrated circuit.

16. The integrated circuit design system of claim 15, wherein enforcing the physical design rules comprises enforcing the physical design rules for each of the at least two nets relative to each of the other of the at least two nets.

17. The integrated circuit design system of claim 16, wherein:
the physical design rules include a minimum spacing requirement between two nets based on voltage of the two nets; and
enforcing the minimum spacing requirement comprises defining the minimum spacing requirement based on a maximum difference between simulated voltages of the two nets as recorded in the simulated electrical parameters in the circuit schematic.

18. The integrated circuit design system of claim 13, further comprising a layout generation module configured to generate a physical circuit layout based on the simulated electrical parameters.

* * * * *